United States Patent [19]
Kitayama

[11] Patent Number: 5,523,037
[45] Date of Patent: Jun. 4, 1996

[54] METHOD OF MANUFACTURING HOLLOW CERAMIC ROLLING ELEMENTS

[75] Inventor: Azuyasu Kitayama, Ibaragi-ken, Japan

[73] Assignee: Nippon Thompson Co., Ltd., Tokyo, Japan

[21] Appl. No.: 288,205

[22] Filed: Aug. 9, 1994

[30] Foreign Application Priority Data

Aug. 31, 1993 [JP] Japan .................................... 5-237242

[51] Int. Cl.$^6$ .................................................. C04B 33/32
[52] U.S. Cl. .................................................. 264/59
[58] Field of Search .................................. 264/43, 44, 56, 264/59, 66

[56] References Cited

U.S. PATENT DOCUMENTS

| | | | |
|---|---|---|---|
| 2,694,245 | 11/1954 | Rogers et al. | 264/66 |
| 3,528,809 | 9/1970 | Redmond et al. | 264/59 |
| 5,296,180 | 3/1994 | Hayes et al. | 264/44 |

FOREIGN PATENT DOCUMENTS 1-249643  10/1989  Japan .
2-107822  8/1990  Japan .

*Primary Examiner*—Christopher A. Fiorilla
*Attorney, Agent, or Firm*—Browdy and Neimark

[57] ABSTRACT

A hollow ceramic rolling element manufacturing method is used to produce hollow rolling elements out of a ceramic material. A support member, which consists of an inflammable volatile material, of a core is inserted into an insert bore in a lower mold member, and a core member of the core is set in a central portion of a cavity formed by a gypsum mold. A slurry a main component of which consists of powder of a ceramic material is introduced from a slurry injection port into a cavity in the gypsum mold closed by engaging joint surfaces of lower and upper mold members with each other. After the slurry in the gypsum mold has been solidified, a layer of the solidified slurry is removed from the gypsum mold, and the molded body removed from the mold is burnt to incinerate the core, whereby a hollow rolling element is produced.

8 Claims, 5 Drawing Sheets

METHOD OF MANUFACTURING HOLLOW CERAMIC ROLLING ELEMENTS

BACKGROUND OF THE INVENTION

1. Field of the Invention

This invention relates to a method of manufacturing hollow ceramic rolling elements in which rolling elements used for a bearing are formed out of a ceramic material, such as $Si_3N_4$.

2. Description of the Prior Art

The ceramic materials have excellent properties including thermal resistance, corrosion resistance, abrasion resistance, non-magnetizability, self-lubricating ability and weight reducing ability as compared with metal materials but substituting ceramic materials for metal materials has problems due to the fragility thereof. Therefore, although the ceramic material itself and sintering and processing techniques therefore have been advanced, steel bearings have not yet been superseded by ceramic bearings.

The ceramic bearings which have heretofore been available include a bearing in which the constituent parts thereof, such as an inner race, an outer race and rolling elements are formed out of a ceramic material, and a bearing in which one or two kinds of constituent parts thereof are formed out of a ceramic material, and these bearings have various effects. Since rolling elements roll in a bearing, simply reducing the weight of a bearing by forming rolling elements out of a ceramic material enables the centrifugal force of the rolling elements to be reduced. The ceramic rolling elements are superior in the seizure resistance, thermal expansion resistance and corrosion resistance owing to their material.

The methods of manufacturing balls for bearings include, for example, a method disclosed in Japanese Patent Laid-Open No. 249643/1989. This ceramic ball manufacturing method consists of the steps of impregnating green balls, which are obtained by molding ceramic powder of silicon nitride, with an organic compound which is in a solid state at normal temperature, grinding the green balls, degreasing the resultant balls, and then sintering the resultant products. The weight of these ceramic balls is smaller than that of metal balls but not greatly smaller since they have a solid structure.

In order to solve these problems, a method of manufacturing hollow balls for bearings has been developed (refer to Japanese Utility Model Laid-Open No. 107822/1990). This method of manufacturing hollow balls for bearings consists of the steps of forming spherical core members out of an organic material, such as polystyrene foam, forming spherical bodies by bonding pulverized bodies of a ceramic material, such as zirconia to the outer circumferential surfaces of the core members while rolling the core members thereon so that the core members are coated with the pulverized bodies, and then incinerating the spherical core members by burning the spherical bodies at 1450° C., whereby hollow rolling elements are produced. In the steps of this method of manufacturing hollow balls for bearings, it is difficult to form a layer of coating of the pulverized bodies to a uniform thickness over the whole region of the outer circumferential surface of a spherical body. Unless the hollow balls for bearings have a uniform wall thickness, problems concerning the strength thereof arise, and, moreover, the weight distribution of each ball becomes unbalanced. Accordingly, when the bearings with such rolling elements inserted therein are rotated, especially, at a high speed, the rolling elements cannot roll smoothly.

SUMMARY OF THE INVENTION

A primary object of the present invention is to solve these problems, and provide a method of manufacturing hollow ceramic rolling elements, i.e. ball type or roller type rolling elements for bearings, such as a rolling bearing, a direct-acting rolling guide unit and a ball spline, consisting of the steps of producing a core from an inflammable volatile material, such as a synthetic resin, a plastic and wax, placing the core in a cavity in a mold, producing a hollow molded body by forming with a ceramic material a layer of a ceramic material on the outer circumferential surface of the core to a uniform thickness by a slip casting method or by applying a slurry consisting of a ceramic material to a hollow wall surface in a mold by a drain casting method, and then burning the hollow molded body so as to obtain hollow sintered body having a uniform wall thickness and uniform strength, whereby it becomes possible to reduce the weight of the sintered body, i.e. a rolling element, give the self-lubricating ability thereto, and have the rolling element roll smoothly even when the bearings are rotated at a high speed.

Another object of the present invention is to provide a method of manufacturing hollow ceramic rolling elements for bearings, in which a core consisting of a core member and a support member and formed out of an inflammable volatile material, and a mold, such as a gypsum mold consisting of a lower mold member having a support bore supporting the mentioned support member and an upper mold member adapted to be engaged with the lower mold so as to form a cavity therebetween and provided with a slurry injection port are used, the method consisting of the steps of placing the core in the central portion of the cavity in the mold, introducing a slurry the main component of which is powder of a ceramic material from the slurry injection port into a space defined by the cavity-defining inner surface of the mold and the outer surface of the core, producing a molded body by removing the slurry from the mold after it has been hardened, producing a hollow burnt body after the molded body has been semi-burnt to incinerate the core, forming a hollow molded rolling element by filling a bore in the hollow burnt body which is formed due to the incineration of the support member of the core with the same slurry as mentioned above, and forming a sintered body of the hollow rolling element by burning this molded body.

This hollow rolling element of a ceramic material in this rolling element manufacturing method can be produced by a slip casting method, in which, when the upper mold member is engaged with the lower mold member with the support member of the core engaged with the support bore in the lower mold member and with the core member of the core positioned in the central portion of the lower mold member, the core can be positioned accurately in the central portion of the cavity in the mold. When a slurry the main component of which is powder of a ceramic material, $Si_3N_4$, is introduced from the slurry injection port of the upper mold member into the cavity in the mold and solidified, a molded body having a solidified layer of a uniform thickness can be formed. A hollow burnt body is obtained by semi-burning the molded body so as to incinerate the core. Since the hollow burnt body has a bore formed due to the incineration of the support member, the same slurry as mentioned above is packed therein to block the core to form a hollow molded rolling element. When this hollow molded rolling element is then burnt, a sintered body of a hollow rolling element can be made.

According to this hollow ceramic rolling element manufacturing method, the support member of the core used for the production of a rolling element is formed to such a thickness that permits the support member to be fitted in an insert bore in the lower mold member, and to such a length that permits the core member of the core to be positioned in the center of the cavity in the mold with the support member fitted up to the lower end of the insert bore. Therefore, when the upper mold member is engaged with the lower mold member with the support member of the core fitted up to the lower end of the insert bore in the lower mold member, the core is positioned in the center of the cavity in the mold, so that the thickness of a solidified layer of the slurry introduced into the space between the core and mold becomes uniform. Accordingly, since a hollow rolling element consisting of a burnt sintered body has a uniform wall thickness, and the weight distribution of the hollow rolling element is balanced well. Consequently, a high-speed rotation or a direct-acting operation of an apparatus in which such hollow rolling elements are incorporated is carried out smoothly. Since the rolling elements consist of hollow rolling elements, the weight thereof is small, and a large inertial force is not exerted thereon, so that the control response of an apparatus at the time of sudden deceleration or sudden stoppage thereof can be improved. The support member of the core functions as a member for positioning a spherical or cylindrical core member of the core in the cavity in a mold, and also supporting the core member.

Still another object of the present invention is to provide a method of manufacturing hollow ceramic rolling elements, using a core which consists of a fixing bore-carrying core member, and a support member engageable with and disengageable from the fixing bore, and which is formed out of an inflammable volatile material, and a mold. An embodiment of this method has the steps of removing a solidified slurry from a mold and a support member from a core member to obtain a molded body, filling a bore, which is formed in the molded body due to the removal of the support member from the core member, with the same slurry as mentioned above without semi-burning the molded body, to produce a molded body of a hollow rolling element, and forming a sintered body of a hollow rolling element by burning the molded body of a hollow rolling element. During the burning of the molded body, the core is incinerated to generate a gas, which is vaporized and scattered to the outside from the opened pores existing in all parts of the sintered body. Accordingly, carrying out only one molded body burning step meets the purpose, i.e. the manhours for burning steps can be reduced.

A further object of the present invention is to provide a method of manufacturing hollow rolling elements of a ceramic material for bearings, in which a mold consisting of a slurry injection port-carrying upper mold member, and a lower mold member adapted to be engaged with the upper mold member and form a cavity therebetween, consisting of the steps of pouring a slurry the main component of which is composed of powder of a ceramic material from the slurry injection port into the cavity in the mold so as to form a layer of deposited slurry on the inner surface of the mold, discharging an excess slurry, which is collected in the central portion of the cavity, from a discharge port formed in the layer of deposited slurry to the outside of the mold after the thickness of this layer has attained a preset level, removing a solidified layer of deposited slurry, filling the discharge port in this layer with the same slurry as mentioned above to produce a molded body of a hollow rolling element, and then producing a sintered body of a hollow rolling element by burning the molded body of a hollow rolling element.

In this hollow ceramic rolling element manufacturing method, rolling elements are produced by a drain casting method, in which hollow molded rolling elements having a deposited layer of a slurry of a uniform thickness is obtained. After the deposited layer of solidified slurry is removed from the mold, the discharge port formed in the deposited layer is filled with the same slurry as mentioned above, so as to close the discharge port and form a molded body of a rolling element. A hollow sintered body of a rolling element can then be formed by burning the molded body of a hollow rolling element. In the step of producing the molded body of a rolling element, the object can also be achieved by filling the discharge port with the slurry after the deposited layer removed from the mold has been semi-burnt.

When a rolling element is produced by utilizing a drain casting method, a slurry is deposited on the inner surface of a mold, and, after the thickness of the deposited layer has reached a predetermined level, an excess slurry is discharged from the interior of a molded body to the outside. Therefore, the wall thickness of a rolling element can be regulated properly by controlling the excess slurry discharging timing.

According to the present invention, a hollow rolling element is formed out a ceramic material, and it is therefore possible to provide a hollow rolling element with excellent properties including a thermal resistance, a seizure resistance, a thermal expansion resistance, a corrosion resistance and non-magnetizability. The texture of the hollow rolling element is formed so as to have a porous structure. Therefore, when the outer surface of the rolling element is subjected to machining, such as grinding and polishing, a plurality of fine recesses are exposed to the outside of the outer surface thereof. When a lubricating oil or a lubricant is inserted in these recesses, it becomes possible to improve the self-lubricating ability of the rolling element and also the sliding characteristics thereof.

Figure 1:
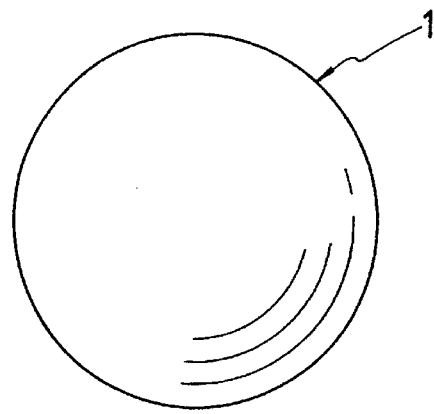
FIG. 1 is a front elevation of a ball as a rolling element produced by the method of manufacturing hollow ceramic rolling elements according to the present invention.
Figure 2:
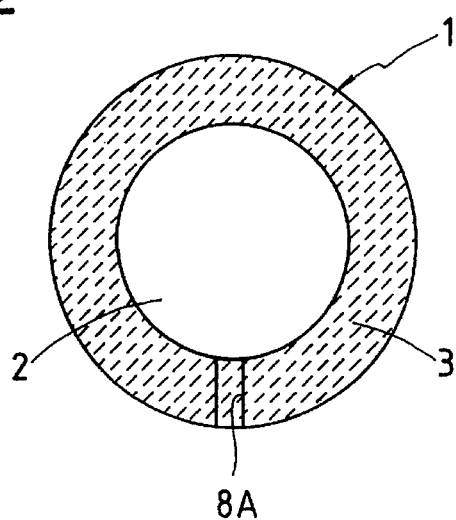
FIG. 2 is a sectional view of the ball shown in FIG. 1.
Figure 3:
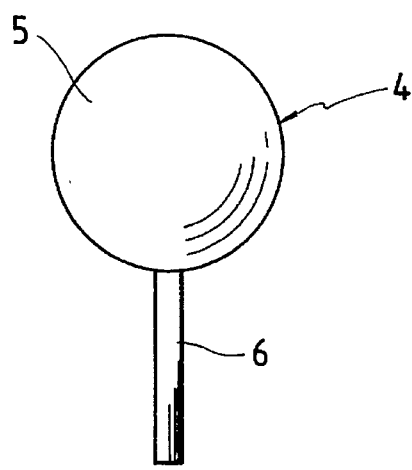
FIG. 3 is a front elevation of an example of a core used in the method of manufacturing hollow ceramic rolling elements according to the present invention.
Figure 4:
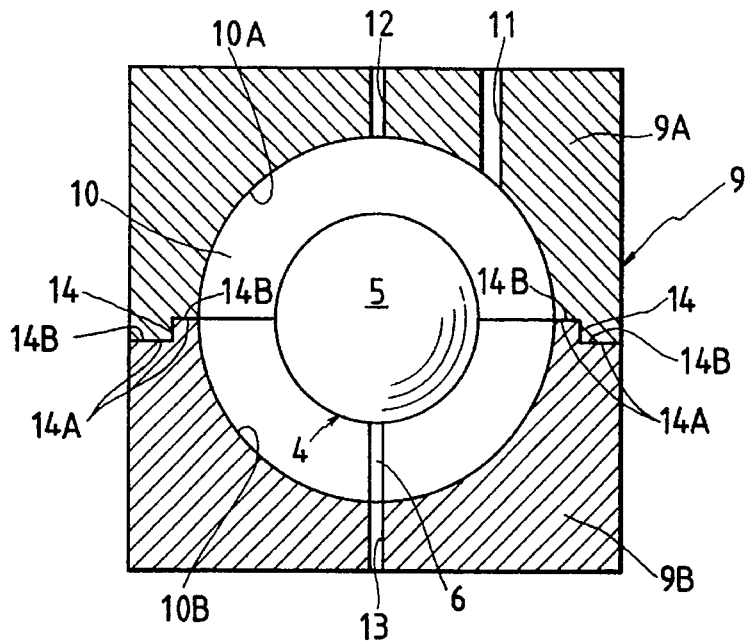
FIG. 4 is a sectional view of a molding unit consisting of a gypsum mold and a core and used for achieving the method of manufacturing hollow ceramic rolling elements according to the present invention.
Figure 5:
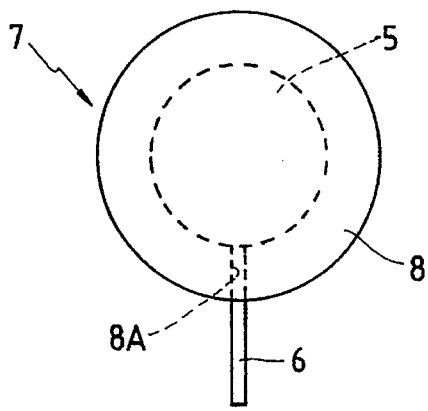
FIG. 5 is a front elevation of an example of a molded body formed by using the molding unit shown in FIG. 4.

DESCRIPTION OF THE PREFERRED EMBODIMENTS:

The method of manufacturing hollow ceramic rolling elements according to the present invention is used to manufacture ball type or roller type rolling elements to be incorporated in bearings, such as a rolling bearing, a direct-acting rolling guide unit and a ball spline. FIGS. 1 and 2 show a ball, i.e. a rolling element 1 produced by the method of manufacturing hollow ceramic rolling elements according to the present invention. FIG. 5 shows a solidified layer 8 of a ceramic material of a uniform thickness which is molded by this hollow ceramic rolling element manufacturing method using the molding unit shown in FIG. 4, and which contains therein a core 4 shown in FIG. 3. FIG. 5 shows the solidified layer 8 of a ceramic material not yet burnt and containing therein a core 4 consisting of a core member 5 and a support member 6. The core 4 consists of a spherical core member 5 and a support member 6, and the support member 6 projects from an outer surface of the spherical core member 5 in the outward perpendicular direction, i.e., in the anti-centripetal direction. As shown in FIG. 3, the core 4 has a spherical core member 5 and a support member 6 which are formed unitarily out of an organic material, such as paraffin, a plastic or wax, i.e. a resin.

In this embodiment, the core 4 consisting of the core member 5 and support member 6 is formed out of a resin material, and a gypsum mold 9, a rolling element producing mold consisting of a lower mold member 9B provided with a support bore 13 for supporting the support member 6, and an upper mold member 9A adapted to be engaged with the lower mold member 9B and form a cavity 10 and provided with a slurry injection port 11 is prepared. The upper mold member 9A has a hemispherical hollow 10A and an air vent 12 providing communication between this hemispherical hollow 10A and the outside. The lower mold member 9B has a hemispherical hollow 10B. The engaging surfaces 14A, 14B via which the upper and lower mold members 9A, 9B are engaged with each other have stepped portions 14 for fixing these mold members in a predetermined position. The upper and lower mold members 9A, 9B are positioned properly by engaging these stepped portions 14 with each other, and the cavity 10 is formed by the hemispherical hollow 10A in the upper mold member 9A and that 10B in the lower mold member 9B.

When the support member 6 of the core 4 is inserted into the insert bore 13 in the lower mold member 9B, the core member 5 is necessarily placed in the central portion of the cavity 10 in the gypsum mold 9. When the core 4 is placed in the gypsum mold 9, a core-solid spherical space is formed between the surface defining the cavity 10 and the outer surface of the core member 5. A slurry the main component of which consists of powder of a ceramic material is then introduced from the slurry injection port 11 into this core-solid spherical space. After the slurry injected into the core-solid spherical space has been solidified, a solidified layer 8 is taken out of the gypsum mold 9 to obtain a molded body 7. The molded body 7 is semi-burnt to incinerate the core 4, so that a hollow burnt body is produced. While the molded body 7 is burnt, the resin constituting the core 4 is incinerated and gasified, so that a hollow 2 occurs in the inner portion, in which the core member 5 has been incinerated, of the molded body 7 with a bore 8A, via which this hollow 2 and the outside communicate with each other, occurring in the portion in which the support member 6 has been incinerated of the molded body 7. Thus, a hollow burnt body is formed. This burnt body has a uniform wall thickness.

The bore 8A occurring due to the incineration of the support member 6 of the core 4 in the hollow burnt body is then filled with the same slurry as mentioned above, so as to close the bore 8A, whereby a molded body of a rolling element is produced. Finally, the molded body of a rolling element is burnt to obtain a sintered body 3 of a rolling element. This sintered body 3 of a rolling element constitutes the hollow rolling element 1. The slurry used in this hollow ceramic rolling element manufacturing method contains as a main component thereof powder of a ceramic material, for example, silicon nitride, a ceramic material of zirconia and alumina.

Figure 12:
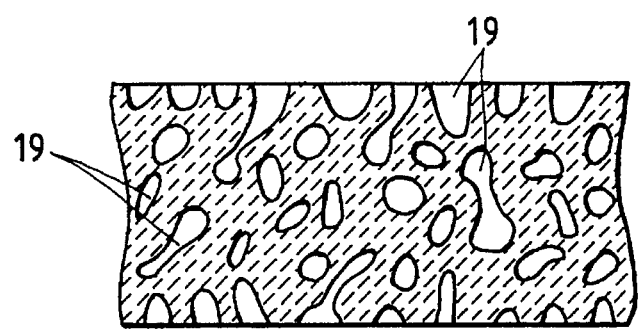
FIG. 12 is an enlarged sectional view illustrating the texture of a rolling element produced by the method of manufacturing hollow ceramic rolling elements according to the present invention.

As shown in FIG. 12, the rolling element 1 produced according to the present invention has a porous structure in which a plurality of pores, i.e. opened pores 19 exist in the texture. Therefore, when the outer surface of the rolling element 1 is subjected to machining, such as grinding and polishing, a plurality of fine recesses are formed in the outer surfaces of the opened pores 19, which recesses can be soaked with a lubricating oil or a lubricant. This enables the lubricating ability (self-lubricating ability) and sliding characteristics of the rolling element 1 to be improved.

Figure 6:
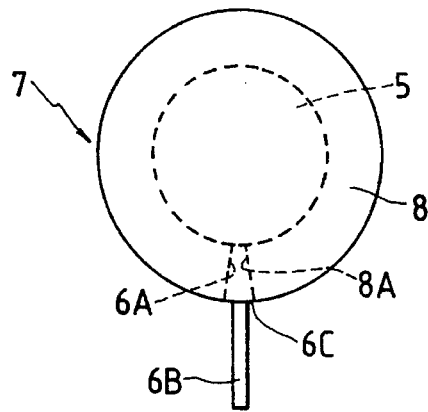
FIG. 6 is a front elevation of another example of a molded body formed by using the molding unit shown in FIG. 4.

The support member 6 of the core 4 may not necessarily consist of a rod of a uniform diameter. For example, as shown in FIG. 6, the support member 6 may consist of an outwardly divergent tapering portion 6A positioned in the cavity in the gypsum mold 9, and a rod portion 6B connected to the tapering portion 6A so as to form a locking portion 6C on a joint end surface thereof. When the rod portion 6B is inserted into the support bore 13 in the lower mold member 9B in such a case, the locking portion 6C engages the lower mold member 9B, so that the positioning of the core 4 with respect to the lower mold member 9B can be done easily. In this case, the bore 8A in the burnt body obtained by semi-burning the molded body 7 is formed as a tapering bore diverging outward. Accordingly, a slurry-filling operation for closing this bore 8A can be carried out excellently. When the support member 6 of the core 4 is formed on a predetermined portion of the outer surface of the core member 5 so as to extend perpendicularly thereto with the support bore 13 in the lower mold member 9B formed in the center of the hemispherical hollow 10B, the core 4 can be set in the central portion of the cavity 10 in the gypsum mold 9 by merely inserting the support member 6 into the support bore 13, i.e., the core 4 can thus be positioned simply in the gypsum mold 9.

Figure 7:
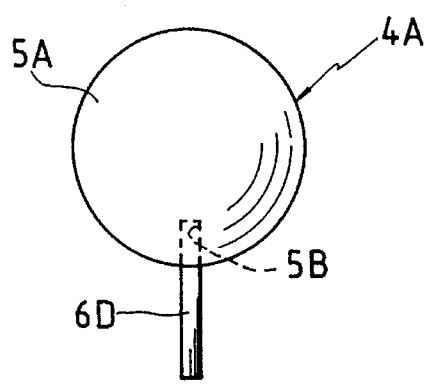
FIG. 7 is another example of the core used in the method of manufacturing hollow ceramic rolling elements according to the present invention.
Figure 8:
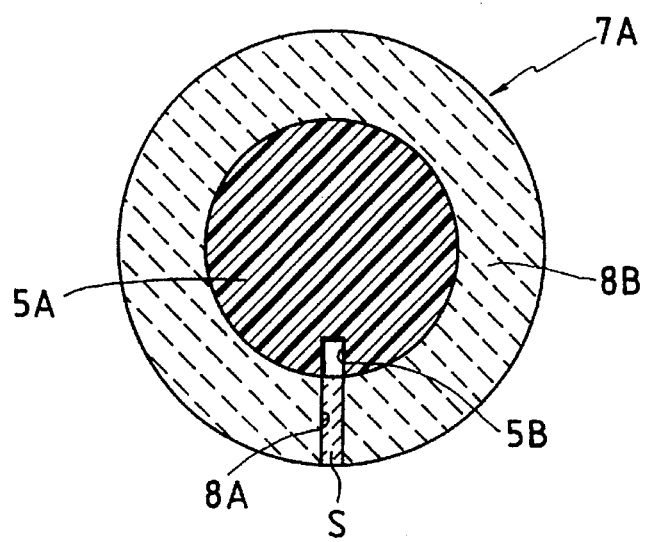
FIG. 8 is a sectional view of a molded body obtained by using the core shown in FIG. 7.

In this hollow ceramic rolling element manufacturing method, the example of the core 4 shown in FIG. 3 is a unitary core consisting of a spherical core member 5 and a support member 6. As shown in FIG. 7, a core 4A may also be produced by forming a spherical core member 5A and a support member 6D separately. Namely, the core 4A can be assembled by forming an insert bore 5B, in which the support member 6D is to be fitted, in the spherical core member 5A so as to extend toward the center of the core member 5A, and fitting the separately formed support member 6D into the insert bore 5B.

When the core 4A is formed so that it can be separated into the core member 5A and support member 6D, the following operational effects can be secured. Before a solidified layer 8B of a ceramic material taken out of the gypsum mold 9 has been burnt, the support member 6D is withdrawn from the solidified layer 8B, and a slurry S is packed in a bore 8A occurring in the portion of the solidified layer 8B from which the support member 6D has been withdrawn, to form a molded body 7A. A sintered body 3 (refer to FIG. 2) of a hollow rolling element can then be obtained by burning the molded body 7A at a predetermined temperature. Therefore, the burning of the molded body 7A can be done by only one step. In the step of burning the molded body 7A, the core member 5A of the core 4A is incinerated to generate a gas, which is vaporized and scattered to the outside through the opened pores 19 (refer to FIG. 12) existing in all parts of the sintered body. In this embodiment, it is preferable to provide the part of the support member 6D which is positioned in the cavity 10 in the gypsum mold 9 with a tapering portion because this tapering portion permits the support member 6D to be withdrawn easily. Therefore, this embodiment is advantageous over the above-described embodiment of FIG. 3 in that it is unnecessary to carry out the burning of the molded body 7 twice.

In these embodiments of the hollow ceramic rolling element manufacturing method, the production of a rolling element consisting of a hollow ball has been described. According to this hollow ceramic rolling element manufacturing method, a cylindrical roller type rolling element shown in FIG. 9 can also be produced by merely slightly modifying the designs of the above-described mold, i.e. the gypsum mold 9 consisting of the upper and lower mold members 9A, 9B, and core 4, 4A. Since the rolling element in this embodiment has a cylindrical shape and not a spherical shape, the recesses for forming such a rolling element which are provided in the upper and lower mold members 9A, 9B in the mold 9 shown in FIG. 4 may be formed as semicylindrical recesses (not shown) and not as recesses like the hemispherical recesses 10A, 10B. The support member 6 of the core 16 is inserted into the support bore 13 formed in the lower mold member 9B of the gypsum mold, i.e. the mold 9 so that the center of the cylindrical core member 17 of the core 16 is positioned in that of the cavity 10 formed in the mold 9. The core 16 shown in FIG. 10 is an example in which the cylindrical core member 17 and support member 6 are formed unitarily but they may not necessarily be formed unitarily. Namely, the core 16 may be formed so that the core member 17 and support member 6 can be separated from each other. As described above, this embodiment and the previously-described embodiments are capable of obtaining a sintered body by the same steps, though the shapes of the gypsum mold and core used in the former are different from those of the gypsum mold and core used in the latter. Therefore, a duplicated description of the sintered body producing steps will be omitted.

Figure 9:
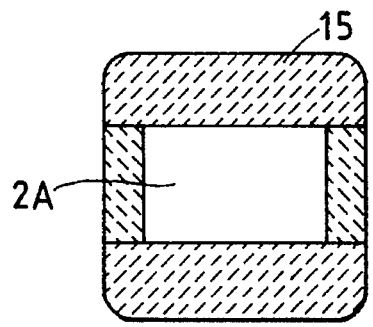
FIG. 9 is a sectional view of a cylindrical roller produced by the method of manufacturing hollow ceramic rolling elements according to the present invention.
Figure 10:
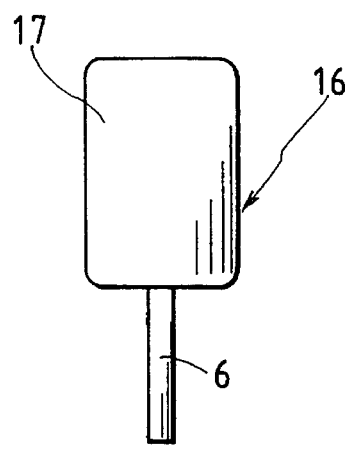
FIG. 10 is a front elevation of an example of a core used to produce the cylindrical roller shown in FIG. 9.
Figure 11:
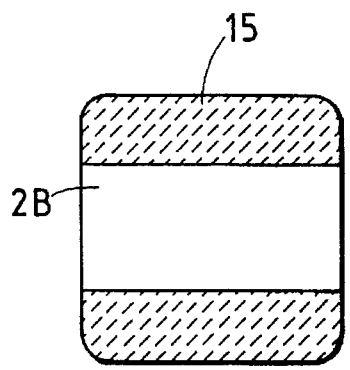
FIG. 11 is a sectional view of another example of a cylindrical roller produced by the method of manufacturing hollow ceramic rolling elements according to the present invention.

The cylindrical roller 15 shown in FIG. 9 has a hollow 2A of a cylindrical shape, and the hollow 2A may have any shape as long as it permits the roller 15 to roll stably and does not spoil the strength thereof. For example, the hollow 2A may be spherical. As shown in FIG. 11, the cylindrical roller 15 may also be formed so that both ends of a cylindrical hollow 2B with respect to the direction in which the axis of rotation of the roller extends are opened.

Figure 13:
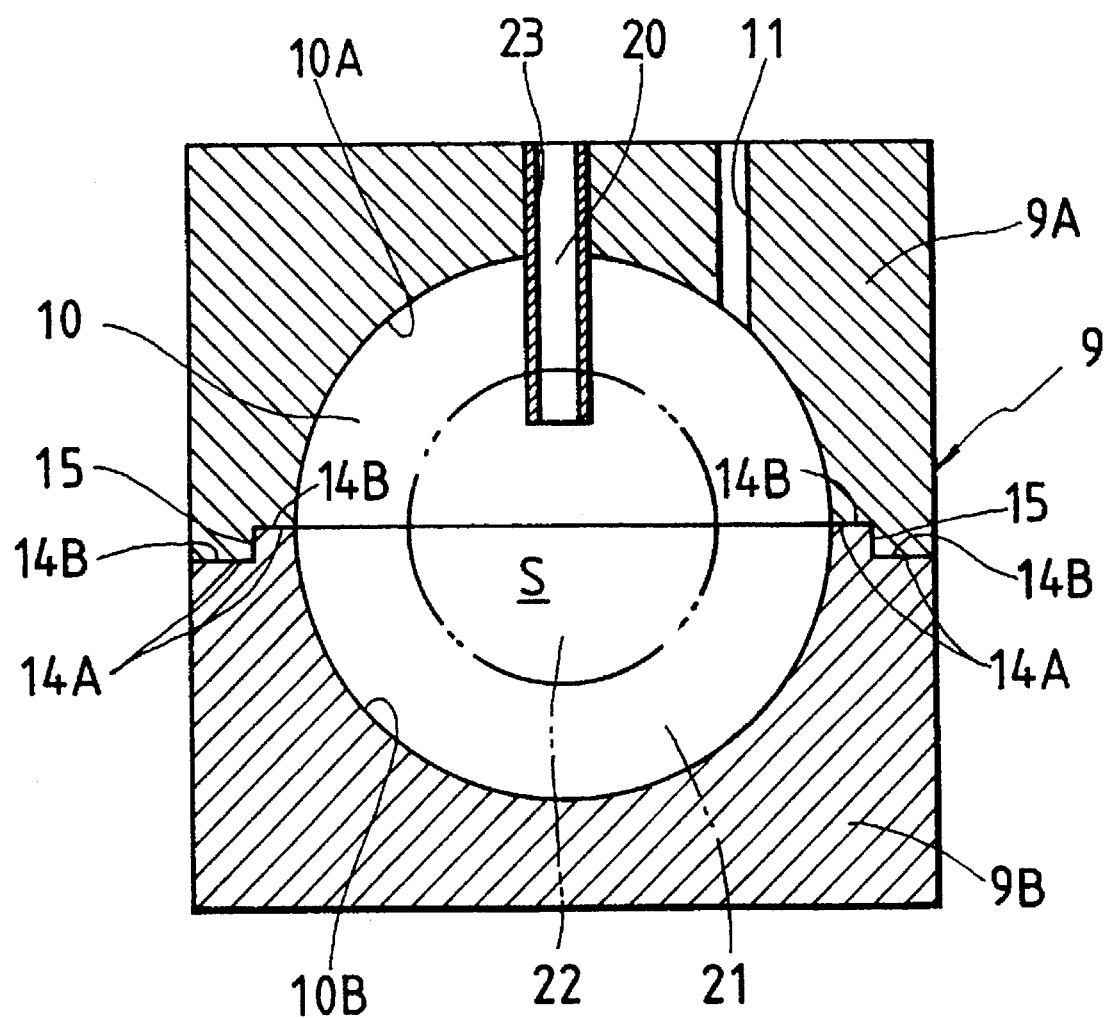
FIG. 13 is a sectional view of a molding unit used to achieve another embodiment of the method of manufacturing hollow ceramic rolling elements according to the present invention.

A further embodiment of the method of manufacturing hollow ceramic rolling elements according to the present invention will now be described. In this embodiment, a rolling element 1 can be produced by a drain casting method using a gypsum mold shown in FIG. 13. Since this gypsum mold is substantially identical with the gypsum mold 9 shown in FIG. 4, the same parts are designated by the same reference numerals. The gypsum mold of FIG. 13 has a discharge port 23 in an upper mold member 9A for discharging an unsolidified slurry therefrom, and does not have an insert bore in a lower mold member 9B because a core need not be placed in a lower mold member 9B.

This hollow ceramic rolling element manufacturing method can be applied to the production of a rolling element of a hollow structure consisting of a hollow ball. First, a gypsum mold 9 consisting of an upper mold member 9A provided with a slurry injection port 11, and a lower mold member 9B engaged with the upper mold member 9A to form a cavity 10 is prepared. A slurry the main component of which consists of ceramic powder is then poured from the slurry injection port 11 of the upper mold member 9A into the cavity 10 in the gypsum mold 9 to form a layer 21 of deposited slurry S on the inner surface of the gypsum mold 9. After the thickness of the layer of deposited slurry has reached a preset level, a discharge pipe 20 is inserted from the discharge port 23 into the inner unsolidified slurry S through the layer 21 of deposited slurry so as to discharge the unsolidified slurry S on the inner side of the layer 21 to the outside. An excess slurry 22 existing in the central portion of the cavity 10 is then discharged from the gypsum mold 9 through the discharge pipe 20. The layer 21 consisting of solidified slurry S is then removed from the gypsum mold 9, and the discharge port 23 made by the boring of the layer 21 is filled with the same slurry S as mentioned above, and this slurry S is dried to produce a molded body 7 of a rolling element. This molded body 7 of a rolling element is then burnt to form a sintered body of a rolling element, whereby a hollow rolling element 1 is completed.

This hollow ceramic rolling element manufacturing method is capable of producing not only ball type rolling elements but also cylindrical rolling elements by a drain casting method. In order to produce a cylindrical rolling element, a gypsum mold having a cylindrical cavity instead of the spherical cavity shown in FIG. 13 may be used.

What is claimed is:

1. A method of manufacturing hollow ceramic rolling elements for bearings, wherein a core including a core member and a support member and formed out of an inflammable volatile material, and a mold including a lower mold member which is adapted to contain said core therein, and which has a support bore supporting said support member, and an upper mold member adapted to be engaged with said lower mold member to form a cavity therebetween and provided with a slurry injection port are used;

said core being set in a central portion of said cavity in said mold, a slurry comprising mainly powder of a ceramic material being introduced from said slurry injection port into said cavity in said mold, a molded body being formed by solidification of said slurry and then said molded body being removed from said mold, a hollow burnt body being then formed by semi-burning said molded body so as to incinerate said core, a bore formed due to the incineration of said support member of said core being filled with the slurry to produce a molded body of a hollow rolling element, a rolling element of a hollow sintered body which has opened pores therein being then formed by burning said molded body of said hollow rolling element.

2. The method of manufacturing hollow ceramic rolling elements according to claim 1, wherein said hollow sintered body consists of any one of $Si_3N_4$, zirconia, and alumina.

3. The method of manufacturing hollow ceramic rolling elements according to claim 1, wherein said hollow ceramic rolling elements include at least one of balls and rollers.

4. The method of manufacturing hollow ceramic rolling elements according to claim 1, wherein said sintered body has in an outer surface thereof fine recesses consisting of said opened pores, said sintered body being able to be self-lubricated with a lubricant permeating said recesses.

5. A method of manufacturing hollow ceramic rolling elements for bearings, wherein a core which includes a core member provided with a fixing bore and a support member engageable with and disengageable from the fixing bore, and which is formed out of an inflammable volatile material, and a mold including a lower mold member which is adapted to contain said core therein, and which has a support bore supporting said support member, and an upper mold member adapted to be engaged with said lower mold member to form a cavity therebetween and provided with a slurry injection port are used;

said core being set in a central portion of said cavity in said mold, a slurry comprising mainly powder of a ceramic material being introduced from said slurry injection port into said cavity in said mold, a molded body being formed by solidification of said slurry and then said molded body being removed from said mold, with said support member taken out from said core member to form a molded body, a bore formed in said molded body due to the removal of said support member from said core member being filled with the slurry to produce a molded body of a rolling element, and said molded body being burnt to be thereby formed of a hollow sintered body having opened pores therein and at the same time said core being incinerated to be volatilized through the opened pores out of said hollow sintered body.

6. The method of manufacturing hollow ceramic rolling elements according to claim 5, wherein said hollow sintered body consists of any one of $Si_3N_4$, zirconia, and alumina.

7. The method of manufacturing hollow ceramic rolling elements according to claim 5, wherein said hollow ceramic rolling elements include at least one of balls and rollers.

8. The method of manufacturing hollow ceramic rolling elements according to claim 5, wherein said sintered body has in an outer surface thereof fine recesses consisting of said opened pores, and sintered body being able to be self-lubricated with a lubricant permeating said recesses.

* * * * *